(12) United States Patent
Bartleson et al.

(10) Patent No.: US 6,934,857 B1
(45) Date of Patent: Aug. 23, 2005

(54) SECURITY SYSTEM AND METHOD FOR HANDHELD COMPUTERS

(75) Inventors: Todd Bartleson, Portland, OR (US); Brandt Haagensen, Portland, OR (US); Brian R. Cox, Aloha, OR (US)

(73) Assignee: Networks Associates Technology, Inc., Santa Clara, CA (US)

(*) Notice: Subject to any disclaimer, the term of this patent is extended or adjusted under 35 U.S.C. 154(b) by 931 days.

(21) Appl. No.: 09/724,187

(22) Filed: Nov. 27, 2000

(51) Int. Cl.[7] .............................................. H04L 9/00
(52) U.S. Cl. ...................................... 713/201; 713/200
(58) Field of Search ............................... 235/472, 106; 382/313; 358/473; 713/188, 193, 200, 201, 713/165, 187, 202; 705/405

(56) References Cited

U.S. PATENT DOCUMENTS 5,572,590 A * 11/1996 Chess .......................... 713/200
5,956,481 A * 9/1999 Walsh et al. ................. 713/200
6,367,012 B1 * 4/2002 Atkinson et al. ............ 713/176

OTHER PUBLICATIONS

Product literature, "Programming a Palm OS in a Nutshell", Palm OS Programmer's Companion, Chapter 1 http://www.palmos.com/dev/tech/docs/palmos/nutshell.html.
Product literature, "Event Loop", Palm OS Programmer's Companion, http://www.palmos.com/dev/tech/docs/palmos/EventLoop.html.

* cited by examiner

Primary Examiner—Kim Vu
Assistant Examiner—Odaiche Akpati
(74) Attorney, Agent, or Firm—Zilka-Kotab, PC; Christopher J. Hamaty

(57) ABSTRACT

A method for detecting possible harmful actions on a handheld computer before they are executed. The method includes monitoring calls to applications resident on the handheld computer and identifying a code associated with a program initiating the call. The action requested by the call is at least temporarily prevented from being performed if the identified code does not correspond to a code associated with data the action is to be performed upon.

18 Claims, 5 Drawing Sheets

| Creator Type | Name | Trust |
|---|---|---|
| addr | Address Book | ☐ |
| bttn | Buttons | ☐ |
| Calc | Calculator | ☐ |
| ANTI | AVScan | ☐ |

SECURITY SYSTEM AND METHOD FOR HANDHELD COMPUTERS

BACKGROUND OF THE INVENTION

The present invention relates generally to a security system and method for handheld computers, and more particularly, to a system and method for detecting potentially harmful actions which may be caused by a computer virus and preventing these actions from being performed on a handheld computer.

A huge surge in computer viruses has occurred in the last decade. Computer viruses have gone from an academic curiosity to a persistent, worldwide problem. Today, viruses affect vast numbers of computers in locations throughout the world. A computer virus is generally a manmade destructive computer program or code that is loaded onto a computer system without the knowledge of the user. The computer virus is often a self-replicating program containing code that explicitly copies itself and can infect other programs by modifying them or their environment. Even a simple virus can be dangerous as the virus can quickly use a large portion of the available memory and possibly bring down the computer system.

The term virus generally refers to any destructible or harmful program or code that attempts to hide its possibly malicious function or tries to spread onto as many computers as possible. Viruses can be written for, and spread on, virtually any computing platform. A virus can infect, or become resident in almost any software component, including an application, operating system, system boot code, or device driver. Computer viruses spread by attaching themselves to other programs (e.g., word processing or spreadsheet applications) or to a boot sector of a disk. When an infected file is activated or executed, or when the computer is started from an infected disk, the virus is also executed and attempts to infect other files. Since a virus is software code, it can be transmitted along with any legitimate software that enters the computer environment. Some viruses are capable of transmitting themselves across networks and bypassing security systems. For example, a virus can spread to files on a local area network (LAN) based file server, and from there to other client systems attached to the server. Similarly, systems that run programs from wide area network (WAN) file servers can become infected if the programs on the server are susceptible to infection. In the networked world of the Internet, viruses can rapidly spread.

Many antivirus programs have become commercially available for protection against viruses. There are three main types of antivirus software: activity monitors, scanners, and integrity checkers. Activity monitoring programs attempt to prevent infection before it happens by looking for virus type activity, such as attempts to reformat a disk. Scanners are the most widely used type of antivirus program. Virus scanners generally operate in batch mode, scanning all files on a system, hard disk, or floppy disk, when requested by the user, or at set intervals. They look for known viruses by searching disks and files for scan strings or patterns. A scanner may be designed to examine specified disks or files on demand, or it may be resident, examining each program that is about to be executed. Most scanning programs include an update feature that allows the antivirus program to download profiles of new viruses from the Internet so that the program can check for new viruses soon after they are discovered. Most scanners also include virus removers which are operable to clean infected files. One example of an antivirus scanner is McAfee's VSHIELD.

The third type of antivirus software, integrity checkers, compute a small checksum or hash value for files which are presumably uninfected, and later compare newly calculated values with the original ones to see if the files have been modified. These programs catch unknown viruses as well as known ones. As with scanners, integrity checkers may be called to check entire disks or they may be resident, checking each program that is about to be executed.

Most of the antivirus software available today, such as conventional device resident antivirus scanners, require a large amount of memory. For example, typical scanner software requires approximately 16 MB RAM. While this memory is typically insignificant on personal computers (e.g., desktop or laptop computers) handheld computers often include no more than 2 MB dynamic memory and storage and are not equipped to handle such large memory requirements. Furthermore, handheld computers are generally too slow to provide reasonable virus scanning performance.

Handheld computers include devices such as personal digital assistants (PDAs) and smart phones which are generally small enough to be held in the hand of a user. These devices typically include applications such as an address book, daily organizer, and electronic notepad. Examples of handheld computers include 3Com's PALM PILOT, Handspring's VISOR, Casio's CASSIOPEIA, Compaq's AERO, Hewlett Packard's JORNADA, NEC's MOBILEPRO, Novaltel's CONTACT WIRELESS, Sharp's MODILON, Vadem's CLIO, Apple's NEWTON, Research in Motion's BLACKBERRY, Psion's REVO, NETBOOK, and WORKABOUT, NeoPoint's 1000, and Qualcomm's PDQ. Handheld computers are widely operated in an environment where software and data records are shared between users. For example, software may be transferred between two handheld computers or downloaded from a personal computer system to a handheld computer. Handheld computers may also receive e-mail messages and other data from another handheld computer via an infrared port or from a personal computer through a modem, serial line connection, or network. In this shared environment, computer viruses can spread among handheld computers as rapidly as they do with personal computer systems.

Malicious code that targets handheld computer operating systems such as the Palm OS (Operating System) are beginning to appear. Thus, installing new software, receiving e-mail, or accepting data into a handheld computer through infrared transfer or by syncing with a personal computer can result in a virus attacking the handheld computer. One virus that has recently been identified on handheld computers is called "Phage". It works by overwriting the beginning of executable files. The host files are destroyed in the process. Once an infected file is transferred to the handheld computer, the virus continues to spread to other programs until they are all infected and destroyed. Phage can spread from one handheld computer to another if infected files are shared via beaming or installed via a docking station.

There is, therefore, a need for a lightweight system and method that identifies potentially harmful code to prevent a virus from destroying data on a handheld computer.

SUMMARY OF THE INVENTION

A security system and method for handheld computers are disclosed. In one aspect of the invention, a method for detecting possibly harmful actions on a handheld computer before they are performed generally comprises monitoring calls to applications resident on the handheld computer and identifying a code associated with a program initiating the call. An action requested by the call is at least temporarily prevented from being performed if the identified code does not correspond to a code associated with data the action is to be performed upon.

The action may be, for example, password manipulation, deletion or modification of a database, or manipulation or corruption of an operating system. The calls may be monitored by a patch installed on a Palm operating system, for example.

In another aspect of the invention, the method generally comprises monitoring requests for action by applications on the handheld computer and evaluating the requests to determine if the requests may result in potentially harmful behavior to data stored on the handheld computer. The action is prevented from being performed if the request is identified as potentially harmful behavior and the user of the handheld computer is notified of the potentially harmful behavior.

A computer program product of the present invention generally comprises computer code that monitors calls to applications resident on the handheld computer and computer code that identifies a code associated with a program initiating the call. The product further includes code that at least temporarily prevents an action requested by the call from being performed if the identified code does not correspond to a code associated with data the action is to be performed upon and a computer readable medium that stores the computer codes.

In yet another aspect of the invention, a computer program product generally comprises code that monitors requests for action by applications on the handheld computer and evaluates the requests to determine if the requests may result in potentially harmful behavior to data stored on the handheld computer. The product further includes code that prevents the action from being performed if the request is identified as potentially harmful behavior and notifies a user of the computer of the potentially harmful behavior. A computer readable medium is provided to store the computer codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
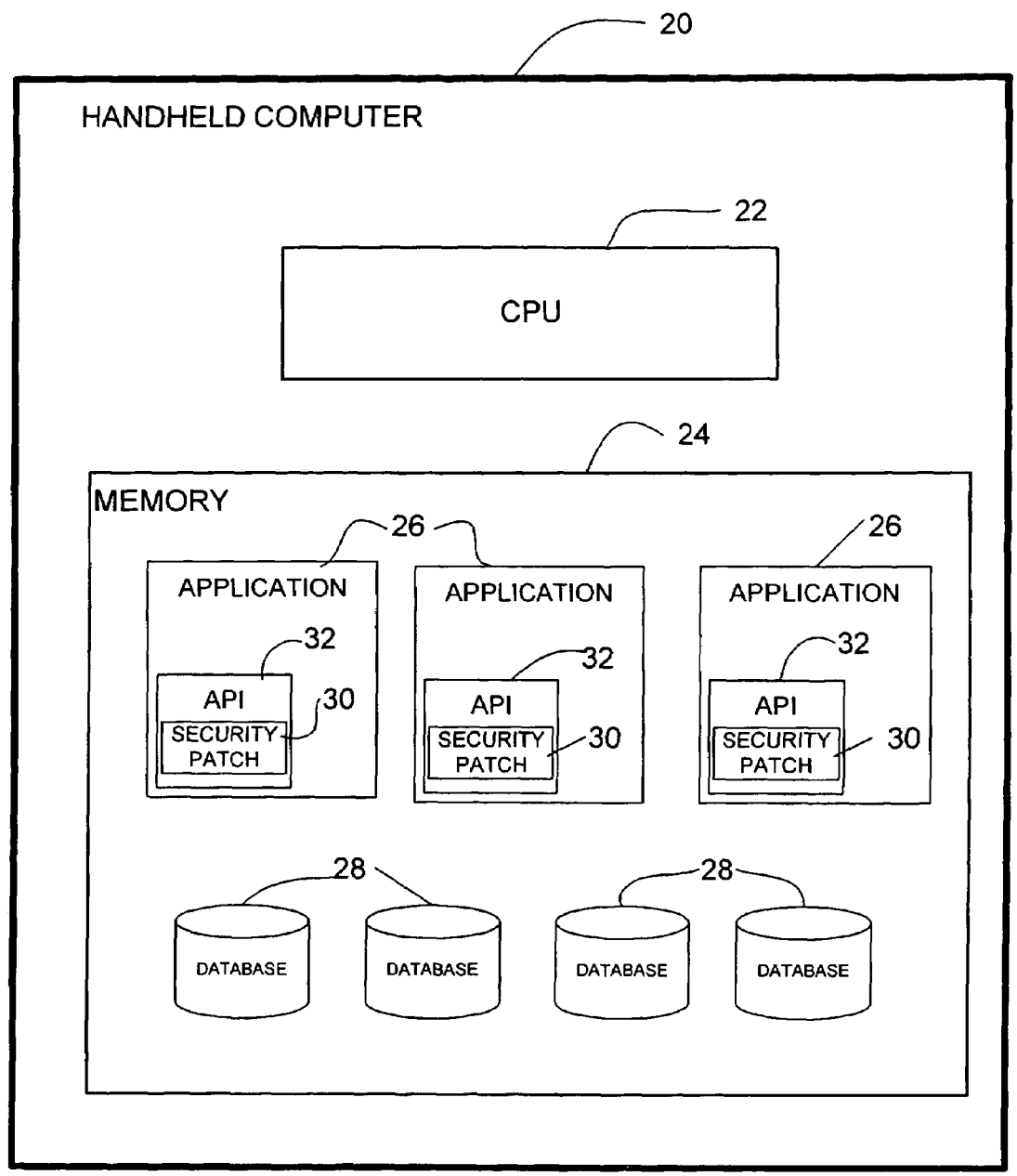
FIG. 1 is a block diagram illustrating a security system of the present invention installed on a handheld computer.

Referring now to the drawings, and first to FIG. 1, a security system of the present invention is shown installed on a handheld computer 20. The handheld computer 20 includes a CPU 22 and memory 24. Stored in memory 24 are a plurality of applications 26 and databases 28. The security system comprises a plurality of security patches 30 placed on API (Application Program Interface) functions 32. As described further below, the patches 30 are inserted at the point of an API function's call so that a program can be monitored to determine if a possibly harmful event is about to occur. The harmful event may be, for example, deleting or modifying a database, corrupting files, or changing passwords.

As previously discussed, handheld computers 20 do not typically include sufficient memory to allow for efficient virus scanning of files directly on the handheld computer. The security system of the present invention does not require the large amount of memory required by conventional scanners. The system instead provides a lightweight system and method for monitoring events and identifying possibly hostile actions. The security system resides on the handheld computer 20 to secure it against malicious code that may change or steal passwords, corrupt or erase files, or disable the operating system. It works in the background to monitor the behavior of installed applications, preventing suspicious activities that have not been authorized. In addition, it checks incoming data and blocks dangerous files from entering the system.

The handheld computer 20 is generally a mobile computing device that is sufficiently compact such that it may be held in a users hands and easily carried by the user. Examples of handheld computers include the following personal digital assistants (PDAs): 3Com's PALM PILOT, Handspring's VISOR, Casio's CASSIOPEIA, Compaq's AERO, Hewlett Packard's JORNADA, NEC's MOBILEPRO, Novaltel's CONTACT WIRELESS, Sharp's MODILON, Vadem's CLIO, Apple's NEWTON, Research in Motion's BLACKBERRY, Franklin's REX, Symbol's SPT and PPT, and Psion's REVO, NETBOOK, and WORKABOUT. Handheld computers also include "smart" phones such as those manufactured by Nokia, Ericsson, NeoPoint, and Qualcomm. The term handheld computer, as used herein, generally includes any compact computing device operable to transfer executable code between itself and another computer. The term handheld computer also includes devices which may be connected to a larger device, such as Clarion's AUTO PC, which is a personal assistant that can be placed in the dashboard of an automobile. Many of these handheld computers operate on a PalmOS platform, or use a Windows CE or EPOC operating system. It is to be understood that the devices and operating systems listed above are merely provided as examples and that the invention is not limited to use with these devices and systems.

Figure 2:
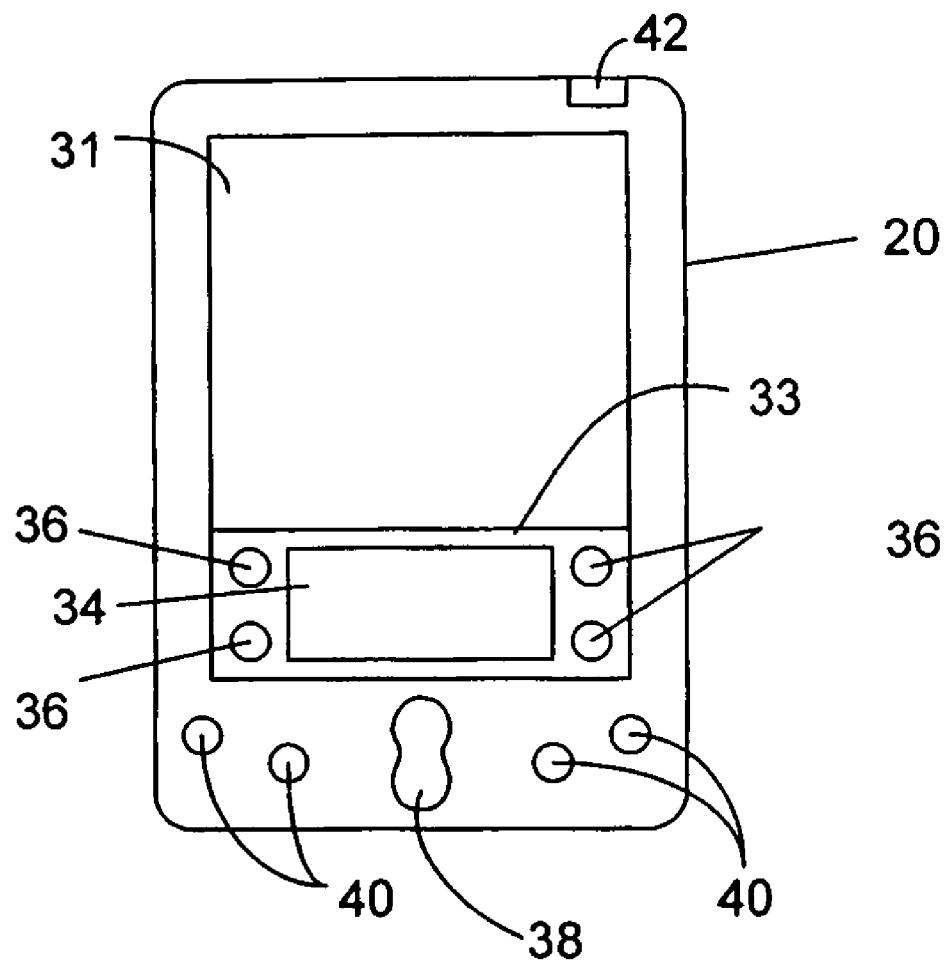
FIG. 2 is a schematic of one example of a handheld computer that can utilize the security system of the present invention.

FIG. 2 represents any one of a variety of portable computing devices such as the handheld computer sold under the trademark PALMPILOT by 3Com Corporation of Santa Clara, Calif. Most of the surface area of the handheld computer 20 consists of a screen display area 31 which is used to display information to the user. The screen display area 31 is covered with a touch sensitive digitizer pad that can detect user interaction with a stylus or finger. Below the display area 31 is a user input area 33 which is used to input text in a writing area 34 and interact with application buttons 36. Below the user input area 33 are a mechanical scrolling button 38 and application buttons 40. A mechanical power button 42 is provided to turn the handheld computer 20 on and off. The application buttons 40 are used to execute applications such as an address book, calendar, To-Do list, or memo pad. The handheld computer 20 generally includes a suite of personal information management (PIM) applications such as an address book, daily organizer, To-Do list, and memo pad. The handheld computer 20 may also include a modem to allow for the transfer of data over a phone line. The computer 20 includes memory 24 which can be utilized to store and retrieve software programs incorporating computer code that implements aspects of the invention, data for use with the invention, and the like. It is to be understood that the handheld computer 20 may be different than shown and described herein without departing from the scope of the invention. For example, the handheld computer may include a miniaturized keyboard and display screen such as included in the Hewlett Packard JORNADA 680.

The security patches 30 are used to check for selected API calls and evaluate the requested action before passing commands onto the system. The patches 30 may be placed on various API calls as described below. The patch 30 is generally a short function or routine which is inserted at the point of an API function's call. The patch 30 monitors the programs running on the handheld computer and notifies the user in the event that behavior is deemed hostile or inappropriate. The patches 30 are standard resource files, similar to standalone applications and include code resources and user interface resources. For example, the patch 30 for the Palm operating system may have a .prc (Palm Resource Code) extension. The following describes an example of a patch for the Palm operating system. It is to be understood, however, that the present invention may be applied to other types of operating systems without departing from the scope of the invention.

Each application in the Palm operating system is identified by a creator code. The creator code is a 4-byte value used to tie together all the databases related to an application. A database is maintained on the handheld computer using the same creator code as the patches. The database contains a list of every creator code resident on the handheld computer. The security system uses these creator codes to prevent a program from modifying a database with a different creator code since this is considered potentially hostile behavior. For example, a virus may be written as a routine that calls for the deletion of the address book database. The virus routine will have a creator code that is different than the address book database creator code. Thus, this action will be identified as potentially harmful behavior. One possible logic scheme for the security system includes preventing any program from modifying a database with a different creator code. However, many programs are designed to modify databases with different creator codes under normal operation. Thus, the security system 30 preferably does not prevent all applications from modifying databases with different creator codes. To handle the applications that are normally designed to modify databases with different creator codes, the security system includes a set of flags indicating the trustedness of the applications. Each application (e.g., address book, calculator, calendar) can be identified as a trusted application. The security system prevents any program that is not trusted to modify a database with a different creator code. Programs identified as trusted are allowed to modify any database on the system. The security system also prevents password manipulation by any program apart from the system that is identified as trusted.

The following is an example of a patch template that may be used to create a security patch 30 for the Palm operating system.

```
//aPatchName
#define CREATORiD 'MCSS' //the security suite's cre-
    ator id
#define RESiD 1003//patch id number
typedef void (*myInterface)(_parameters);
void aPatchName(_parameters);
void aPatchName(_parameters p)
{myInterface oldTrap;
    //allocate a function pointer DWord value;
    //allocate a 32 bit value to write the address into
        FtrGet(CREATORiD, RESiD, &value);
    //retrieve the system's original api address, saved as a
        feature during the patch installation oldTrap=(my-
        Interface) value;
    //assign the function pointer the retrieved address,
        casting the address to the proper function type
    //do whatever logic the specific goal of the patch
        requires oldTrap(p);
    //call the system's original api address, with the same
        parameters pass into the patch}
```

The above template defines a creator ID and patch ID and allocates a function pointer that is used to replace the original API address. The patch 30 is used to perform the logic of the original API call and pass this information to the patch so that the patch can check for possibly hostile behavior before allowing a requested action to be executed.

The patches 30 are loaded into the operating system when the security system is enabled. A pointer is first created for each patch 30. The pointer to the original address is identified and this address is replaced with the new patch address using "get trap" and "set trap" address commands (listed below). The "get trap" command is used to get the original operating system address listed in a feature table for each function for which a patch 30 is being installed. The following routine may be used to find the pointer and replace the pointer with a new address linked to the patch:

get trap (index, void original address)
    feature set (index, original address)
    new address=find code resource
    set trap (index, new address)

A reverse process is performed to disable the patch 30. When a patch is disabled, the original address is first identified and the new address is replaced with the original address. This may be performed, for example, when the security system is turned off or a specific application is identified as a trusted application.

The following is a list of possible patches for different API calls:

System Application Launch: Determines which program is currently active in the system and most likely responsible for any calls to patched functions.

Create Database: Responsible for the creation of databases.

Delete Database: Responsible for the deletion of databases.

New Record: Responsible for the creation of records within a database.

Get Record: Responsible for editing or modifying records within a database.

Delete Record: Used to delete records from a database.

Remove Record: Used to delete records from a database.

Password Verify: Compares a given string against the system's user password.

Password Set: Sets the system's user password.

Password Remove: Removes the system's user password.

System Handle Event: Used to watch for special events such as power on and off.

Set Attributes: Sets attributes on database or individual record.

Query Record: Opens record for reading.

It is to be understood that the above are only examples of API calls for which security patches 30 may be attached. The security patches 30 may be used for many other API calls used on handheld computers 20.

Figure 3:
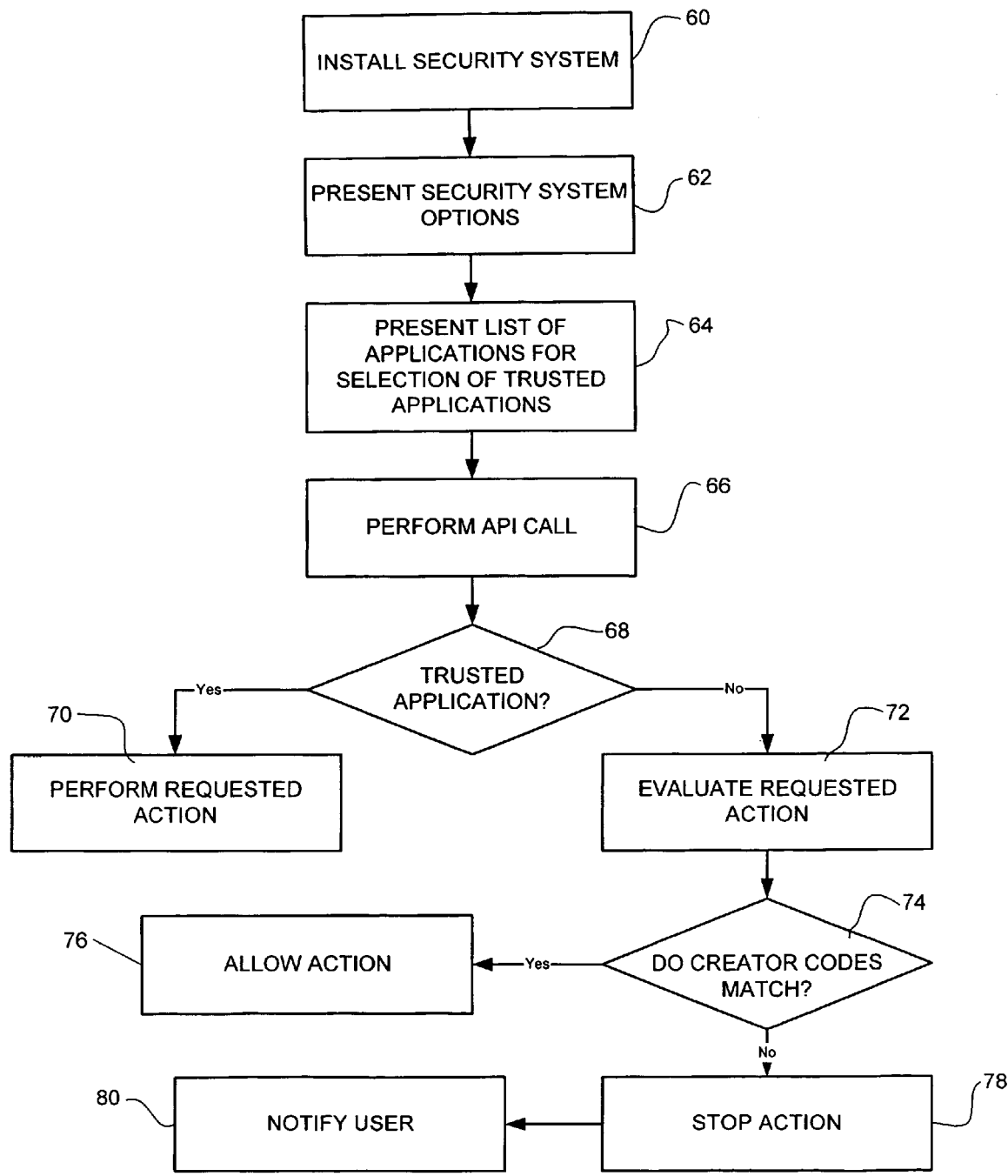
FIG. 3 is a flowchart illustrating a process for operating the security system on the handheld computer.
Figure 4:
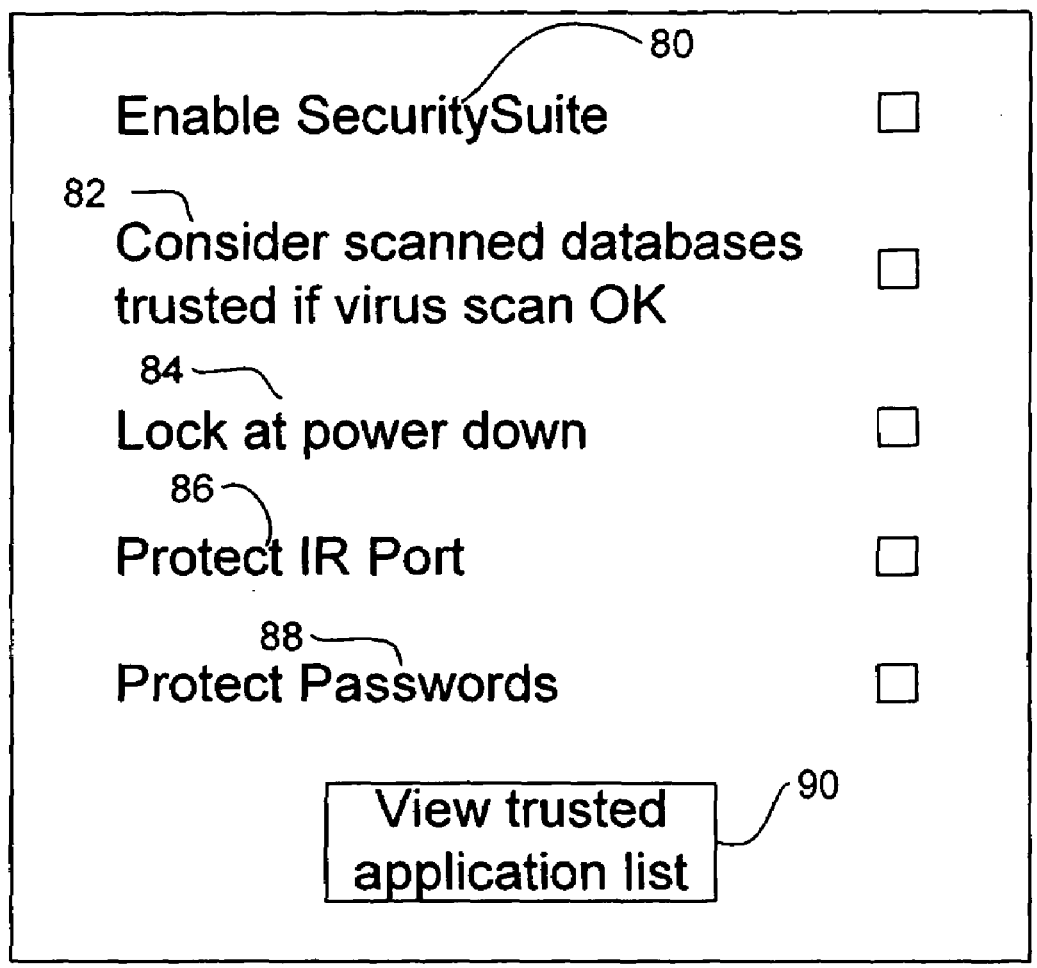
FIG. 4 is a dialog box displayed on a screen of the handheld computer to select preferences for operation of the security system.
Figures 5, 6:
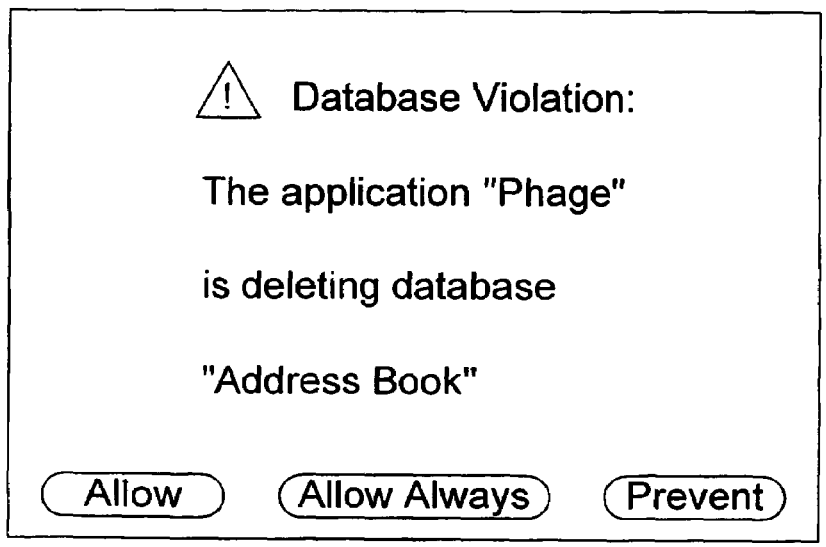
FIG. 5 is an exemplary screen displayed on the handheld computer and used to identify trusted applications.
FIG. 6 is an exemplary screen displayed on the handheld computer when a database violation is identified.

FIG. 3 is a flowchart illustrating a process for enabling the security system on handheld computer 20 and monitoring actions performed by programs running on the computer. The security system may be installed during synchronization of the handheld computer with a personal computer or may be installed via the IR port, for example. After the security system is installed on the handheld computer 20 (step 60), the user is presented with a list of security system options on the display screen 31 of the handheld computer (step 62). The options may include those shown in FIG. 4, for example. The first option 80 allows the user to enable the security system by checking a box next to "Enable Security Suite". The next option 82 is used to specify whether or not scanned databases are considered trusted if a virus scan is ok. This option prevents the security system from checking databases that have been scanned on a personal computer when the handheld computer was synchronized with the personal computer. The "Lock at power down" option 84 requires the user to enter a password to turn the computer back on. The "Protect IR Port" option 86 determines whether the security system will check data that has entered the computer through the IR port. If this option 86 is checked a temporary database is created upon any IR interaction. The data will not be loaded onto the handheld computer 20 until it has been verified by the security system or the user verifies that the data is ok. The "Protect Passwords" option 88 enables the patches 30 designed to monitor the password API functions. After selecting the appropriate options, the user may specify which applications are to be considered trusted applications by selecting the "View Trusted Application List" box 90. A screen such as shown in FIG. 5 is then displayed to the user (step 64). This user interface allows the user to specify which applications will be considered trusted applications. Only trusted applications will be allowed to modify a database having a different creator code than the application.

When an application is called that is a trusted application, the security system will allow the application to perform its function without monitoring the requests (steps 66, 68, and 70). If the application called is not identified as a trusted application, the appropriate patch 30 will check the integrity of actions that are to be performed by the application (steps 66, 68, and 72). If the application or program requesting the action has a creator code corresponding to the creator code of the data the action is to be performed upon, the action is allowed (steps 74 and 76). If the creator codes do not match, the action will be at least temporarily prevented from executing (step 78). The security system may then notify a user of the handheld computer that a potentially harmful action has been requested (step 80). For example, if a virus such as Phage attempts to delete data from the handheld computer, the patch 30 will identify that the application Phage is attempting to perform an action on a database having a different creator code and display a warning message such as shown in FIG. 6. The user has the option to allow the application to continue, always allow the identified application to perform the identified action, or prevent the application from performing the specified action. In the case of an unknown application, such as the virus Phage, the user would select the Prevent option.

It will be observed from the foregoing that the security system and method described herein provide numerous advantages. Importantly, the security system and method allow for efficient detection of viruses on a handheld computer without sacrificing the limited memory of the handheld computer.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for detecting potentially harmful actions on a handheld computer, the method comprising:

monitoring calls to applications resident on the handheld computer;

identifying a code associated with a program initiating said call;

wherein identifying a code comprises identifying a creator code on a handheld computer operating system; and at least temporarily preventing an action requested by said call from being executed if the identified creator code does not match a creator code associated with data said action is to be performed upon;

wherein the creator code is used to prevent malicious behavior;

wherein at least one of the applications is identified as a trusted application;

wherein the trusted application is not prevented from performing actions even if the creator code associated with the trusted application does not match the creator code associated with the data said action is to be performed upon;

wherein the creator code is a 4-byte value used to tie together a plurality of databases related to an application, at least one database is maintained on the handheld computer using a first creator code that is the same as a second creator code associated with a plurality of patches, the at least one database contains a list of a plurality of the creator codes resident on the handheld computer, and at least one creator code is used to prevent a program from modifying one of the databases with a different creator code.

2. The method of claim 1 wherein monitoring calls to applications comprises installing a patch on the handheld computer, the patch being operable to intercept calls.

3. The method of claim 2 wherein installing a patch comprises replacing an API address with a patch address.

4. The method of claim 2 wherein installing a patch comprises utilizing get trap and set trap commands.

5. The method of claim 1 further comprising receiving data on an infrared port of the handheld computer and installing said date in a temporary database.

6. The method of claim 5 further comprising asking a user whether to accept said data before loading said data onto the handheld computer.

7. The method of claim 1 wherein the action requested is a password manipulation.

8. The method of claim 1 wherein the action requested is deletion of data.

9. The method of claim 1 wherein the action requested is modification of data.

10. The method of claim 1 wherein the action requested is manipulation of an operating system.

11. A method for detecting potentially harmful actions on a handheld computer, the method comprising:
monitoring requests for action by applications on the handheld computer;
evaluating said requests to determine if said requests may result in potentially harmful behavior to data stored on the handheld computer;
preventing said action from being performed if one of said requests for action is identified as potentially harmful behavior; and
notifying a user of the handheld computer of said potentially harmful behavior;
wherein evaluating said requests comprises comparing a creator code associated with the application requesting said action with a creator code associated with data the action is to be performed upon;
wherein the creator code is used to prevent malicious behavior;
wherein at least one of the applications is identified as a trusted application;
wherein the trusted application is not prevented from performing actions even if said one request is identified as potentially harmful, if requested by the trusted application;
wherein the creator code is a 4-byte value used to tie together a plurality of databases related to an application, at least one database is maintained on the handheld computer using a first creator code that is the same as a second creator code associated with a plurality of patches, the at least one database contains a list of a plurality of the creator codes resident on the handheld computer, and at least one creator code is used to prevent a program from modifying one of the databases with a different creator code.

12. The method of claim 11 wherein monitoring the requests for action comprises monitoring API calls.

13. A computer program product for detecting possibly harmful actions on a handheld computer before the actions are executed, the product comprising:
computer code that monitors calls to applications resident on the handheld computer;
computer code that identifies a code associated with a program initiating said call;
wherein a creator code on a handheld computer operating system is identified;
computer code that at least temporarily prevents an action requested by said call from being performed if the identified creator code does not match a creator code associated with data said action is to be performed upon; and
a computer readable medium that stores said computer codes;
wherein the creator code is used to prevent malicious behavior;
wherein at least one of the applications is identified as a trusted application;
wherein the trusted application is not prevented from performing actions even if the creator code associated with the trusted application docs not match the creator code associated with the data said action is to be performed upon;
wherein the creator code is a 4-byte value used to tie together a plurality of databases related to an application, at least one database is maintained on the handheld computer using a first creator code that is the same as a second creator code associated with a plurality of patches, the at least one database contains a list of a plurality of the creator codes resident on the handheld computer, and at least one creator code is used to prevent a program from modifying one of the databases with a different creator code.

14. A computer program product for detecting possibly harmful actions on a handheld computer before the actions are executed, the product comprising:
computer code that monitors requests for action by applications on the handheld computer;
computer code that evaluates said requests to determine if said requests may result in potentially harmful behavior to data stored on the handheld computer;
computer code that prevents said action from being performed if one of said requests for action is identified as potentially harmful behavior;
computer code that notifies a user of the handheld computer of said potentially harmful behavior; and
a computer readable medium that stores said computer codes;
wherein evaluating said requests comprises comparing a creator code associated with the application requesting said action with a creator code associated with data the action is to be performed upon;
wherein the creator code is used to prevent malicious behavior;
wherein at least one of the applications is identified as a trusted application;
wherein the trusted application is not prevented from performing actions even if the creator code associated with the trusted application does not match the creator code associated with the data said action is to be performed upon;
wherein the creator code is a 4-byte value used to tie together a plurality of databases related to an application, at least one database is maintained on the handheld computer using a first creator code that is the same as a second creator code associated with a plurality of patches, the at least one database contains a list of a plurality of the creator codes resident on the handheld computer, and at least one creator code is used to prevent a program from modifying one of the databases with a different creator code.

15. The method of claim 1, wherein a user has an options of disabling the detection of potentially harmful actions, specifying whether a plurality of databases scanned by a virus scanner are considered trusted if the virus scanner returns a favorable result, requiring a password to turn the handheld computer on, checking data that has entered the handheld computer through an infra-red (IR) port, protecting passwords, and specifying the trusted application.

16. The method of claim 1, wherein the temporary prevention of the action requested by said call involves notifying a user that the potentially harmful action has been requested and giving the user a plurality of options selected from the group consisting of: allowing one of the applications to continue with the action, always allowing one of the applications to perform the action, and preventing one of the applications from performing the action.

17. The method of claim 4, wherein the get trap and set trap commands identify a pointer to an original address and replace the original address with a new patch address.

18. The method of claim 1, wherein an efficient detection of viruses is provided for the handheld computer without sacrificing limited memory of the handheld computer.

* * * * *

UNITED STATES PATENT AND TRADEMARK OFFICE
CERTIFICATE OF CORRECTION

PATENT NO. : 6,934,857 B1
APPLICATION NO. : 09/724187
DATED : August 23, 2005
INVENTOR(S) : Bartleson et al.

It is certified that error appears in the above-identified patent and that said Letters Patent is hereby corrected as shown below:

col. 9, line 7, change "date" to --data--;
   col. 10, line 12, change "docs" to --does-.

Signed and Sealed this

Sixteenth Day of November, 2010

David J. Kappos
*Director of the United States Patent and Trademark Office*